United States Patent [19]

Austgen, Jr. et al.

[11] Patent Number: 5,336,712

[45] Date of Patent: Aug. 9, 1994

[54] PROCESS FOR MAKING SUBMICRON STABLE LATEXES OF BLOCK COPOLYMERS

[75] Inventors: David M. Austgen, Jr., Missouri City; Jeffrey G. Southwick, Houston, both of Tex.

[73] Assignee: Shell Oil Company, Houston, Tex.

[21] Appl. No.: 35,870

[22] Filed: Mar. 23, 1993

Related U.S. Application Data

[63] Continuation-in-part of Ser. No. 880,796, May 8, 1992, abandoned.

[51] Int. Cl.⁵ ............................ C08J 3/03; C08J 3/215
[52] U.S. Cl. .................................. 524/530; 524/531; 524/533; 524/534; 524/535; 524/536; 523/340
[58] Field of Search ............... 524/534, 530, 531, 533, 524/534, 535, 536; 523/340

[56] References Cited

U.S. PATENT DOCUMENTS

| | | | |
|---|---|---|---|
| 3,238,173 | 3/1966 | Bailey et al. | 524/534 |
| 3,360,599 | 12/1967 | Nyberg et al. | 264/216 |
| 3,445,414 | 5/1969 | Glymph et al. | 260/23 |
| 3,726,824 | 4/1973 | Saunders et al. | 260/29.7 R |
| 3,839,258 | 10/1974 | Visseren et al. | 524/364 |
| 4,177,177 | 12/1979 | Vanderhoff et al. | 260/29.2 |
| 4,331,581 | 5/1982 | Davison | 524/364 |
| 4,942,209 | 7/1990 | Gunesin | 526/173 |
| 5,100,938 | 3/1992 | Vitkuske et al. | 524/68 |

FOREIGN PATENT DOCUMENTS

| | | |
|---|---|---|
| 292262 | 11/1988 | European Pat. Off. |
| 50-26849 | 3/1975 | Japan |
| 1416932 | 12/1975 | United Kingdom |

OTHER PUBLICATIONS

*Kraton ® Thermoplastic Rubber*, published by Shell Chemical Co., 1987 (p. 31).

Shell Chemical Co. Technical Bulletin, SC 1047-91, published in 1991, "Selection of Solvents for Kraton ® 1901X Rubber".

*Primary Examiner*—Romulo H. Delmendo
*Attorney, Agent, or Firm*—Donald F. Haas

[57] ABSTRACT

This invention is a process for producing stable polymer emulsions and latexes with an average particle size of less than one micron. The polymers are block copolymers of conjugated dienes and vinyl aromatic hydrocarbons which may or may not contain polar functionality. The process comprises making a polymer cement of the polymer and a blend of a solvent for the polymer and a cosolvent(s), emulsifying the polymer cement by adding it to an aqueous phase containing at least one surfactant and removing the solvent, cosolvent and excess water.

16 Claims, No Drawings

PROCESS FOR MAKING SUBMICRON STABLE LATEXES OF BLOCK COPOLYMERS

REFERENCE TO PRIOR APPLICATION

This application is a continuation-in-part of pending application Ser. No. 880,796, filed May 8, 1992, now abandoned.

BACKGROUND OF THE INVENTION

This invention relates to the production of fine stable latexes of block copolymers of vinyl aromatic hydrocarbons and conjugated dienes. More specifically, it relates to the production of such latexes which have submicron particle sizes and low surfactant to polymer ratios by using appropriate cosolvents during preparation of the latexes.

It is known that a block copolymer can be obtained by an anionic copolymerization of a conjugated diene compound and an alkenyl arene compound by using an organic alkali metal initiator. Block copolymers have been produced which comprise blocks of these different monomers such as configurations which are linear, radial or star, i.e. many arms radiating from a central core. The proportion of thermoplastic blocks to elastomeric blocks and the relative molecular weights of each of these blocks is balanced to obtain a rubber having unique performance characteristics.

It has been found advantageous to prepare latexes of these polymers in order to obtain products that can be formulated into coatings and adhesive films having little or no organic solvents. In some cases, low levels of organic solvents are useful to control evaporation of water or to serve as coalescing aids. But the quantity of organic solvent needed to control evaporation or aid coalescence will be much less than that needed to make corresponding coatings and adhesive films from organic solvent solutions (solvent-borne coatings and adhesives). Therefore, these latexes are comprised of the polymer, surfactants, and coalescing and evaporation control solvents and water.

Preparation of such latexes is well known to those skilled in the art (see U.S. Pat. Nos. 3,360,599, 3,238,173 and 3,726,824). Latexes of polyvinyl aromatic - polydiene block copolymers are conventionally made by (1) dissolving the block copolymer in an organic solvent or solvents to form a polymer cement, (2) emulsifying the polymer cement in an aqueous solution containing one or more surfactants, and (3) stripping the emulsion of organic and excess aqueous liquids to form a stable, suitably concentrated latex. Polymer cements are often available directly from the polymerization reactor.

Block copolymer cement solutions that are to be emulsified typically contain from 5 to 30 weight percent polymer. It is advantageous for the polymer concentration in the cement to be as high as possible. Increasing the polymer concentration in the cement reduces the amount of solvent and excess water that must be removed following emulsification. It also reduces the surfactant to polymer ratio in the final latex. Surfactants are usually present such that the total concentration of surfactants ranges from about 0.5 to more than 50 parts per hundred rubber (phr), where the rubber is the block copolymer. A high surfactant concentration can negatively impact adhesive properties of coatings and adhesives. It can also render coatings and adhesives water sensitive.

The maximum concentration of a polydiene-polyvinyl aromatic block copolymer in the cement is limited by the viscosity and elasticity of the cement. For some block copolymers it is not practically possible to make stable block copolymer cement emulsions with average drop size of less than one micron from cements containing a single solvent unless the polymer concentration in the cement is less than 15 weight percent. This is especially true for functionalized block copolymers containing polar groups that may associate. It is also true for unfunctionalized block copolymers having total molecular weights greater than 25,000 and polyvinyl aromatic block molecular weights greater than 5000. Moreover, emulsification of cements containing functionalized block copolymers at concentrations greater than 10 weight percent in a single solvent frequently results in multiple emulsions with large and very disperse drop size distributions. By multiple emulsions, we mean water-in-cement-in-water emulsions wherein water droplets are dispersed in cement droplets that are, in turn, dispersed in a continuous aqueous phase. Multiple emulsions are undesirable because average particles sizes are large and water can be entrained in polymer latex particles which can negatively impact coating or adhesive properties.

Fine polymer cement emulsions are necessary in order to make fine latexes. Fine particle size latexes are advantageous because particles remain stable and dispersed with less surfactant. Particles in the range of one micron and larger tend to cream because the density of the cement is less than the density of the aqueous phase. It is also known that small (submicron) particle sizes in latexes can enhance coating and adhesive performance. Thus, it is highly advantageous to be able to produce a stable polymer cement emulsion with an average drop size of less than one micron without the formation of multiple emulsions.

SUMMARY OF THE INVENTION

This invention provides a process for producing stable polymer latexes with an average particle size of less than one micron. First, a polymer cement comprising up to 30 weight percent of a block copolymer of a conjugated diene and a vinyl aromatic hydrocarbon in a base solvent/non-aromatic cosolvent blend is made. The base solvent is hereafter referred to as the solvent and is usually capable of dissolving the block copolymer without the aid of cosolvents. It is frequently a selective solvent for the major block(s). The major block is usually the polydiene block.

The non-aromatic cosolvent comprises from 5 to 50 percent by weight of the solvent blend. The cosolvent may itself be a blend of non-aromatic cosolvents. The specific cosolvents chosen for the cement depend on the nature of the block copolymer. If the polymer is not functionalized, then it is advantageous to add a single non-aromatic cosolvent that is a selective solvent for the vinyl aromatic hydrocarbon block. The base solvent should also be non-aromatic. In this case, the solubility parameter of the cosolvent should range from 8.7 to 9.9. If the block copolymer is functionalized with polar groups, then it is advantageous to add a polar cosolvent. Some polar cosolvents may also be selective solvents for the polyvinyl aromatic block. For block copolymers of conjugated dienes and vinyl aromatic hydrocarbons, the preferred cosolvents are methyl ethyl ketone, ethyl acetate and methyl isobutyl ketone. For such block copolymers containing polar functional groups, the preferred cosolvents are methyl ethyl ketone, ethyl acetate, isopropyl alcohol, methyl isobutyl ketone, isopropyl acetate and n-propyl acetate.

The cement is then emulsified in an aqueous solution containing from 0.1 to 10% weight percent of at least one surfactant. The ratio of aqueous phase to cement can range from 10:1 to 1:3, preferably 2:1 to 1:2. Finally the solvent and cosolvent are stripped from the emulsion using conventional techniques. Excess water can be removed simultaneously or sequentially with the organic solvents to concentrate the latex.

DETAILED DESCRIPTION OF THE INVENTION

As is well known, block copolymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,2-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethylstyrene, vinylnaphthalene, vinylanthracene and the like may be used. The block copolymers may have linear, radial or star configurations.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$RLi_n$

Wherein:

R is an aliphatic, cycloaliphatic, aromatic or alkyl-substituted aromatic hydrocarbon radical having from 1 to about 20 carbon atoms; and n is an integer of 1 to 4.

In general, many of the solvents known in the prior art to be useful in the preparation of such polymers such as a non-aromatic solvent, may be used as the base solvent in cement. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene, and the like; hydrogenated aromatic hydrocarbons, such as tetralin, decalin and the like; halogenated hydrocarbons, particularly halogenated aromatic hydrocarbons, such as chlorobenzene, chlorotoluene and the like.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multi block copolymer by copolymerizing a mixture of conjugated diene and vinyl aromatic hydrocarbon monomers utilizing the difference in their copolymerization reactivity rates. Various patents describe the appropriation of multi block copolymers containing tapered copolymer blocks including U.S. Pat. Nos. 3,251,905, 3,265,765, 3,639,521, and 4,208,356 which are herein incorporated by reference. If desired, these block copolymers can be hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated by reference.

The functionalized block copolymers of the present invention are hydrogenated and unhydrogenated block copolymers which have been reacted with various acid functional group-containing molecules. The acid functional group containing molecules which may be reacted with such block copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent. Sulfonic acid functionalized polymers, such as described in U.S. Pat. No. 4,086,171 which is herein incorporated by reference, may also be used. The acid functionalized block copolymers utilized may contain at least about 0.1% of the functional groups and preferably from about 0.5% to about 30%.

Cements are generally prepared by mixing the block copolymer of a conjugated diene and vinyl aromatic in a single solvent that is capable of dissolving the entire polymer. Because the polydiene block(s) (elastomeric block) usually comprises the major fraction of the molecular weight of a polydiene-polyvinyl aromatic block copolymer, a single solvent that is a good solvent for polydiene block is most often used to make a cement. However, polydiene blocks or hydrogenated polydiene blocks are substantially different in chemical nature from polyvinyl aromatic blocks. Hence, solvents that effectively solubilize polydiene blocks are often poor solvents for polyvinyl aromatic blocks. As a result, the vinyl aromatic hydrocarbon blocks may interact and associate in the cement phase. Such association causes the apparent molecular weight of the block copolymer in the cement to be greater than the true molecular weight. If the molecular weight of an unfunctionalized block copolymer of conjugated diene and vinyl aromatic hydrocarbon is greater than about 25,000, the vinyl aromatic hydrocarbon block molecular weights are greater than 5000 and the total concentration of polymer is greater than 15 weight percent in a single solvent that is a good solvent for the polydiene block, then association of the vinyl aromatic hydrocarbon blocks generally will effectively increase the viscosity and elasticity of the cement.

If the conjugated diene block is also grafted with polar functional groups which are capable of hydrogen bonding and for which the cement solvent is a poor solvent, then the polar groups may strongly associate in the cement. This also leads to higher apparent molecular weights in the cement. Such functionalization can effect a dramatic increase in cement elasticity and viscosity relative to a cement containing the same concentration of corresponding unfunctionalized block copolymer.

As stated earlier, emulsification of cements containing a single organic solvent that is capable of dissolving the entire polymer but is a good solvent for the polydiene block and a poor solvent for the polyvinyl aromatic blocks and more than 15 weight percent of a high molecular weight block copolymer or more than 10 weight percent of a functionalized block copolymer results in unstable polydisperse emulsions with large average drop sizes. Under these conditions multiple emulsions (water-in-cement-water) frequently form.

We hypothesize that the large drop sizes that are formed in such systems are due mainly to the high elasticity and, to a lesser extent, the viscosity of the conjugated diene/vinyl aromatic hydrocarbon block copolymer cements. In the process of emulsification, disperse phase droplets are continually broken into smaller droplets until the desired or minimum drop size is achieved. If the cement phase to be dispersed is elastic, then the cement tends to oppose drop breakup, resulting in large average drop sizes.

We have found that a cement-in-water emulsion can be made with an average droplet diameter of less than one micron from a cement containing between 15 and 30 weight percent of a high total molecular weight copolymer, having a high polyvinyl aromatic block molecular weight or 10 to 30 weight percent of a functionalized block copolymer, an appropriate base solvent and one or more appropriate non-aromatic cosolvents. By high molecular weight, we mean generally above 25,000, peak molecular weight of the main species as determined by gel permeation chromatography. By high polyvinyl aromatic block molecular weight, we mean that the vinyl aromatic hydrocarbon blocks have molecular weights in excess of 5000. Multiple emulsions are much less likely to be formed from such cements. Also, less surfactant is required in the aqueous phase and less mixing energy is required to prepare fine cement emulsions from cements containing appropriate cosolvents. Moreover, the latexes formed by solvent stripping such cement emulsions have smaller average particle sizes, are more stable and resist creaming to a greater extent.

An appropriate solvent (base solvent) is one that effectively solubilizes the rubber block of the block copolymer. An appropriate cosolvent for an unfunctionalized block copolymer is one that is non-aromatic and effectively solubilizes the vinyl aromatic hydrocarbon blocks. An appropriate cosolvent for a functionalized block copolymer is one that effectively solubilizes the vinyl aromatic hydrocarbon blocks and solvates the grafted polar functional groups grafted to the polymer. A single cosolvent may do both. It is not necessary to use a cosolvent to emulsify unfunctionalized polymers when aromatic hydrocarbons are used as the base solvent. In this case, the cosolvent provides no advantage, but it is necessary when functionalized polymers are emulsified and an aromatic base solvent is used. It is advantageous to be able to work with non-aromatic solvents because aromatics are toxic and are difficult to work with in emulsification because their boiling points are generally higher than that of water.

Because the cosolvents are chosen such that they effectively solubilize the vinyl aromatic hydrocarbon blocks and solvate any functional groups, they reduce interpolymer interactions. At a given polymer concentration, the presence of an appropriate cosolvent or cosolvent blend effectively reduces polymer cement elasticity and viscosity. We hypothesize that it is mainly the reduction of cement elasticity and, to a lesser extent, the reduction of cement viscosity, that allows drops to be more efficiently broken down such that the final drop size distribution is smaller than it would be in the absence of the cosolvent. A cement-in-water emulsion with a smaller average drop size will yield a block copolymer latex with a smaller average particle size upon solvent removal, thereby improving the latex stability.

Cosolvents should be used in an amount from 5 to 50 percent by weight of the total solvent in the cement. If less than this amount is used, then there will be little effect on emulsion droplet size, and, therefore, on latex particle size. If more is used, then the copolymer will we insufficiently solubilized in the solvent/cosolvent blend and unstable emulsions will be formed. For unfunctionalized polymers, the preferred range for the non-aromatic cosolvent is 20 to 45 percent and for functionalized polymers it is 5 to 45 percent cosolvent depending on the solvent used.

The cosolvent should be chosen on the basis of its compatibility with or its ability to interact with the particular polymer which is to be dispersed as a latex. The cosolvents within the scope of this invention that are useful for emulsifying unfunctionalized polymers are non-aromatic. In the case of unfunctionalized block copolymers of conjugated dienes and vinyl aromatics hydrocarbons, the base solvent is capable of solubilizing the entire block copolymer and is usually a good solvent for the polydiene block. The cosolvent should be one or more organic liquids that are good solvents for the vinyl aromatic hydrocarbon block. The cosolvent should have a solubility parameter in the range from 8.7 to 9.9, preferably as close to 9.1 as possible. Hildebrand's solubility parameter is a measure of the total forces holding the molecules of a solid or a liquid together. It has the units of $(cal/cm^3)^{\frac{1}{2}}$. Every compound is characterized by a specific value of solubility parameter, although this value may not always be recorded in convenient literature references. Material s having the same solubility parameter tend to be miscible. Those with different solubility parameters tend to be immiscible. Discussions of solubility parameter concepts are presented in (1) *Encyclopedia of Polymer Science and Technology*, Interscience, New York (1965), Vol. 3, page 833; and (2) *Encyclopedia of Chemical Technology*, Interscience, New York (1971), Supplement Volume, page 889 which are herein incorporated by reference.

In the case of such block copolymers containing polar functional groups, at least one cosolvent should be polar in nature. Another cosolvent, of the type described for use with unfunctionalized polymers, may be included to achieve enhanced results.

Examples of cosolvents from the first group (and their solubility parameters) include methyl ethyl ketone (9.3), ethyl acetate (9.1), tetrahydrofuran (9.9), diethyl ketone (9.9), n-propyl acetate (8.75), diethylene glycol monoethyl ether (9.7), dipropylene glycol monomethyl ether (9.6), cyclohexanone (9.9) and diacetone alcohol (9.2). Others which can be used include isophorone (9.1), methyl cyclohexanone (9.3), propyl formate (9.2), dibutyl phthalate (9.4), ethylene glycol monobutyl ether, diethylene glycol (9.1) and 2-ethylhexanol (9.5).

Examples of cosolvents which are polar in nature include isopropyl alcohol, methyl ethyl ketone, acetone, isobutyl isobutyrate, ethyl acetate, methyl isobutyl ketone, n-butyl alcohol and isopropyl acetate. Other polar solvents which can be used include diisobutyl ketone, diisopropyl ketone, methyl isobutyl ketone, methyl amyl ketone, methyl propyl ketone, diethyl ketone, isophorone, diacetone alcohol, acetone, cyclopentanone, cyclobutadione, isobutyl n-butyrate, isopropyl isobutyrate, methyl amyl acetate, butyl butyrate, sec. butyl acetate, sec. amyl acetate, isobutyl acetate, isopropyl acetate, amylacetate, butyl acetate, cellosolve acetate, propyl formate, dibutyl phthalate, methyl acetate, ethyl lactate, butyronitrile, acetonitrile, propylene carbonate, ethylene carbonate, diethyl ether, dimethyl ether, dichloroethyl ether, dioxane, tetrahydrofuran, butyl carbitol, butyl cellosolve, diethylene glycol, 2-ethylhexanol, carbitol, cellosolve, methyl isobutyl carbinol, n-octanol, 2-ethyl butanol, n-hexanol, sec. butanol, n-pentanol, n-butanol, cyclohexanol, isopropanol, n-propanol, ethanol, ethylene glycol, methanol, and glycerol.

The polymer cement containing the cosolvent is emulsified in an aqueous phase containing from 0.1 to 10 percent by weight of at least one surfactant. The surfactant serves two purposes: (1) It serves to reduce the interfacial tension between water and the cement which, in turn, reduces the amount of energy required to produce a fine dispersion of cement droplets. (2) It serves to prevent droplet coagulation and coalescence; that is, it stabilizes the emulsion as it is formed.

The amount of surfactant depends, in part, on the ratio of cement to aqueous phase and on the characteristics of the surfactant. If less than 0.1% based on total polymer (weight percent) is used, then insufficient surfactant may be present to reduce interfacial tension and stabilize the emulsion. More than 10% based on total organics is usually not necessary and is undesirable. If the latex is to be used in an adhesive, then no more than 2% based on total polymer (weight percent) should be used because surfactant molecules tend to migrate to the surface and reduce adhesion.

The surfactants may be nonionic, anionic, cationic or a combination of two or more of these types. Anionic surfactants are generally more effective emulsifiers of block copolymer cements than nonionic surfactants. Mixtures of anionic and nonionic surfactants are frequently used.

Effective anionic surfactants include sulfonates and sulfates with the general formulas $R-SO_3M$ and $R-O-SO_3M$ where R represents a hydrophobic moiety and M represents an alkali metal. Examples include sodium dodecyl sulfate, sodium lauryl sulfate, sodium salt of sulfated Neodol® alcohols, sodium salts of sulfated Neodol® ethoxylates, sodium dodecyl benzene sulfonate, sodium alkyl naphthalene sulfonate, sodium dioctyl sulfosuccinate. Salts of sulfated alkyl-phenol ethoxylates are also effective anionic emulsifiers. Examples of effective nonionic surfactant emulsifiers include the family of alkyl-phenol ethoxylates represented by the formula $R-(OC_2H_4)_nOH$, where R is usually an octyl or nonyl chain and n has a value from 1 to 35, preferably 4 to 15.

Specific examples of surfactants which are useful herein include Neodol® 25-S, Neodol® 23-3S, Neodol® 23-9S, Neodol® 45-S, Alipal® EP-110, Alipal® EP-120, Calsoft F90, Nekal® BA-77, Emcol 4500, octyl phenol ethoxylates having 1 to 35 ethylene oxide groups and nonyl phenol ethoxylates having 1 to 35 ethylene oxide groups such as the Igepal® CA & CO series sold commercially by Rhone-Poulenc. Water soluble nonionic block copolymers are also frequently used to stabilize latexes. Examples of the latter include the Synperonic T range of polypropylene oxide - polyethylene oxide block copolymers from ICI.

Emulsions can be prepared by contacting the aqueous surfactant solution and the polymer cement under conditions of high shear. Typical emulsification equipment includes the following: sonic horn, colloid mill, homogenizer, liquid whistle and high shear mixer. The amount of energy required to form an emulsion with a given average drop size depends largely upon the interfacial tension between the cement phase and the aqueous phase and the viscosity of the cement phase. Low interfacial tensions and low cement viscosities require less mixing energy to achieve a desired average drop size.

It is preferred, although not necessary, that the polymer cement containing the cosolvent be emulsified by adding the cement slowly to a known volume of water containing surfactant(s) which is agitated using a suitable emulsification device. This procedure promotes the efficient preparation of cement-in-water emulsions with small average drop sizes. Another preferred element of the process is that at least one anionic surfactant should be used because anionic surfactants are more effective emulsifiers of the cement emulsions at a given total surfactant concentration than are cationic or nonionic surfactants. Another preferred element of the process is that the minimal surfactant level consistent with stable emulsions and latexes is used to minimize foaming during solvent stripping. The final emulsion may contain up to 75 weight percent of the cement as the dispersed phase. This is an aqueous phase to cement ratio of 1:3.

The solvent and the cosolvent are removed from the emulsion by standard flashing or stripping techniques.

The temperature of stripping can range from 25° to 100° C. and the stripping pressure can range from 760 down to 10 millimeters of mercury. It is preferred to flash solvent by reducing the pressure on the emulsion and increasing the emulsion temperature moderately. Excess water may be removed at the same time or later in order to concentrate the resulting latex to the desired percent solids. Alternately, the latex can be concentrated using conventional centrifugation techniques or by creaming. Sufficient water is removed to concentrate the latex to from 15 weight percent polymer to 70 weight percent polymer.

The process of the present invention produced block copolymer latexes which are very stable and very fine, i.e., have average particle sizes of less than one micron. Such polymer latexes are useful for producing waterborne coatings containing little or no solvent, and formulating into water-based adhesives including pressure sensitive adhesives, contact adhesives, and construction mastic adhesives.

EXAMPLE 1

A polymer cement of a linear hydrogenated triblock copolymer of the type ABA where the A block is polystyrene and the B block is poly(ethylene-butylene) was made containing 20 weight percent polymer and 80 percent cyclohexane. Sixty grams of the polymer cement were added slowly, in five increments, to forty grams of an aqueous solution containing one weight percent sodium lauryl sulfate, an anionic surfactant. Between additions, the water-cement mixture was subjected to mixing by sonification with a 400 watt, one-half inch sonic horn (Branson Sonifier Model 450) operating at 20 kHz and about 30 percent of maximum power for 15 to 20 seconds. The mixing produced a cement-in-water emulsion. The log normal intensity average particle size of the emulsion after all cement additions was determined by dynamic light scattering to be between 0.95 and 2.0 microns (bimodal distribution).

EXAMPLE 2

A polymer cement of a linear hydrogenated triblock copolymer identical to the polymer described in Example 1 was made. The cement was comprised of 20 weight percent block copolymer, 48 weight percent cyclohexane, and 32 weight percent methyl ethyl ketone. Sixty grams of the polymer cement were emulsified as described in Example 1 in forty grams of an aqueous solution containing 1 weight percent sodium lauryl sulfate. The log normal intensity average particle size of the emulsion was determined by dynamic light scattering to be 0.48 microns. The organic solvents and excess water were evaporated from the emulsion in a rotary evaporator operating under vacuum at 48° C. for 2 hours. The log normal intensity average particle size of the resulting latex was determined by dynamic light scattering to be 0.41 microns and unimodal. The latex was 24.5 weight percent solids measured gravimetrically.

EXAMPLE 3

A polymer cement of a linear hydrogenated triblock copolymer of the type ABA in which the A block was polystyrene and the B block was poly(ethylene-butadiene) which had been grafted with about two weight percent maleic anhydride was prepared. In the presence of moisture, maleic anhydride is converted to maleic acid. Maleic acid is capable of hydrogen bonding interactions. The cement was comprised of 15 weight percent of the polymer and 85 weight percent cyclohexane. Fifty grams of the polymer cement were added slowly, in five increments, to fifty grams of a 1 weight percent solution of sodium dodecyl sulfate, an anionic surfactant. Between additions, the water-cement mixture was subjected to mixing with a 400 watt, one-half inch sonic horn (Branson Sonifier Model 450) operating at 20 kHz and about 30 percent of maximum power for 15 to 20 seconds. The mixing produced a cement-in-water emulsion. The average droplet size was determined by optical microscopy to be substantially greater than one micron. Optical microscopy also indicated evidence of water droplets entrained within cement droplets (water-in-cement-in-water emulsion).

EXAMPLE 4

A polymer cement comprised of 10 weight percent of the polymer described in Example 3 and 90 weight percent cyclohexane was prepared. Fifty grams of the cement was emulsified as described in Example 3 in fifty grams of an aqueous solution containing 1 weight percent sodium dodecyl sulfate. The average drop size was determined by optical microscopy to be substantially greater than one micron. Optical microscopy again indicated evidence of water droplets entrained within cement droplets (water-in-cement-in-water emulsion).

EXAMPLE 5

A polymer cement comprised of 20 weight percent of the polymer described in Example 3, 32 weight percent methyl ethyl ketone and 48 weight percent cyclohexane was prepared. Fifty grams of the cement were emulsified as described in Example 3 in fifty grams of an aqueous solution containing 1 weight percent sodium dodecyl sulfate. The average droplet size was determined by optical microscopy to be less than one micron. The organic solvents and excess water were evaporated from the emulsion in a rotary evaporator operating under vacuum initially at 40° C., but increasing to 50° C. during solvent removal. The log normal intensity average particle size of the latex was determined by dynamic light scattering to be 0.28 microns. The final latex was 25 weight percent solids.

EXAMPLE 6

A polymer cement comprised of 20 weight percent of the polymer described in Example 3, 8 weight percent isopropyl alcohol and 72 weight percent cyclohexane was prepared. Fifty grams of the cement were emulsified as described in Example 3 in fifty grams of an aqueous solution containing one weight percent sodium dodecyl sulfate. The average droplet size was determined by optical microscopy to be on the order of one micron. The log normal intensity average particle size of the cement emulsion was determined by dynamic light scattering to be 0.68 microns.

EXAMPLE 7

A polymer cement comprised of 20 weight percent of the polymer described in Example 3, 24 weight percent ethyl acetate and 56 weight percent cyclohexane was prepared. Fifty grams of the cement were emulsified as described in Example 3 in fifty grams of an aqueous solution containing 1 weight percent sodium dodecyl sulfate. The average drop size was determined by optical microscopy to be less than one micron. The log normal intensity average emulsion drop size was determined by dynamic light scattering to be 0.39 microns. The organic solvents and excess water were evaporated from the emulsion in a rotary evaporator operating under vacuum at 55° C. The log normal intensity average particle size of the latex was determined by dynamic light scattering to be 0.31 microns. The final latex was 24 weight percent solids.

EXAMPLE 8

A polymer cement comprised of 20 weight percent of the polymer described in Example 3, 24 weight percent methyl isobutyl ketone and 56 weight percent cyclohexane was prepared. Fifty grams of the cement were emulsified as described in Example 3 in fifty grams of an aqueous solution containing 1 weight percent sodium dodecyl sulfate. The average drop size was determined by optical microscopy to be less than one micron. The organic solvents and excess water were evaporated from the emulsion in a rotary evaporator operating under vacuum at 55° C. The intensity average particle size of the latex was determined by dynamic light scattering to be 0.49 microns. The final latex was 20 weight percent solids.

EXAMPLE 9

A polymer cement comprised of 20 weight percent of the polymer described in Example 3, 32 weight percent methyl ethyl ketone and 48 weight percent cyclohexane was prepared. Sixty five grams of the cement were emulsified in 35 grams of an aqueous solution containing one weight percent of Neodol ® 25-S, a sodium salt of a sulfated Neodol ® alcohol with a carbon chain containing 12 to 15 carbon atoms. A second identical batch was produced. The two batches were combined to produce a single larger batch. The intensity mean droplet size of the cement emulsion was determined by light scattering to be 0.69 microns. The organic solvents and excess water were then evaporated from the emulsion in a rotary evaporator operating under vacuum at 48° C. The resulting latex was determined to be approximately 27 weight percent solids. The log normal intensity average particle size of the latex was measured by light scattering to be 0.50 microns.

EXAMPLE 10

A polymer cement comprised of 20 weight percent of the polymer described in Example 3, 32 weight percent of methyl ethyl ketone and 48 weight percent of cyclohexane was prepared. Seventy grams of the cement were emulsified in 30 grams of an aqueous solution containing one weight percent of sodium dodecyl sulfate, an anionic surfactant. The organic solvents and excess water were stripped in a rotary evaporator operating under vacuum at 50° C. The weight percent solids of the latex was determined gravimetrically to be 30. The log normal intensity average particle size was determined to be 0.32 microns by light scattering.

EXAMPLE 11

A number of polymer emulsions were made using a variety of surfactants according to the method of Example 1 with the polymers used in Examples 1 and 3. The ratio of solvent to cosolvent, in this case cyclohexane to methyl ethyl ketone, ranged from 100:0 to 60:40. The cement to water ratios ranged from 50:50 to 70:30. The results are shown in the following tables.

The results indicate that anionic surfactants, especially sulfonates and sulfates, are generally effective emulsifiers and stabilizers for polymer cements in water. Nonionic surfactants are generally less effective emulsifiers and must be present at substantially greater levels in order to make emulsions with submicron average drop sizes.

TABLE 1

Example 11. Polymer Cement Emulsion Drop Size and Stability Against Phase Segregation. Cements are 20% Polymer in Various Blends of MEK and CH. The polymer is a linear hydrogenated triblock copolymer of the type ABA where A is styrene and B is hydrogenated butadiene.

| Emulsifier | Emulsifier Concentration (phr)* | Cement:H$_2$O Ratio | Mean Drop Diameter (μm) | Phase Segregation | MEK:CH Ratio |
|---|---|---|---|---|---|
| SDS | 10.0 | 50:50 | 0.84 | yes | 0:100 |
| SDS | 10.0 | 50:50 | 0.87 | yes | 5:95 |
| SDS | 10.0 | 50:50 | 0.66 | no | 10:90 |
| SDS | 10.0 | 50:50 | 0.74 | no | 15:85 |
| SDS | 10.0 | 50:50 | 0.63 | no | 20:80 |
| SDS | 10.0 | 50:50 | 0.38 | no | 30:70 |
| SDS | 10.0 | 50:50 | 0.51 | no | 40:60 |
| SDS | 6.7 | 60:40 | 0.60 | no | 30:70 |
| SDS | 5.4 | 63:35 | 0.42 | no | 30:70 |
| SDS | 4.3 | 70:30 | 0.38 | no | 30:70 |
| SDS | 2.7 | 65:35 | 0.48 | no | 30:70 |
| SDS | 2.1 | 70:30 | 0.43 | no | 30:70 |
| SLS | 2.7 | 65:35 | 0.43 | no | 30:70 |
| N25-S | 2.7 | 65:35 | 0.55 | no | 30:70 |
| N23-9S | 2.7 | 65:35 | 0.66 | no | 30:70 |
| N23-6.5S | 2.7 | 65:35 | 0.66 | no | 30:70 |
| N23-3S | 2.7 | 65:35 | 1.07 | no | 30:70 |
| N45-S | 2.7 | 65:35 | 0.58 | no | 30:70 |
| Alipal ® EP-110 | 2.7 | 65:35 | 0.58 | no | 30:70 |
| Alipal ® EP-120 | 2.7 | 65:35 | 0.67 | no | 30:70 |
| CalSoft F-90 | 2.7 | 65:35 | 0.47 | no | 30:70 |
| Nekal ® BA-77 | 2.7 | 65:35 | 0.80 | no | 30:70 |
| Emcol 4500 | 2.7 | 65:35 | 0.68 | no | 30:70 |
| OP(7.5)/T-908 (3:1) | 2.7 | 65:35 | — | yes | 30:70 |
| OP(10) | 5.4 | 65:35 | — | phase inversion | 30:70 |
| OP(10) | 6.7 | 60:40 | 2.47 | yes | 30:70 |
| CA-630/CA-890 (1:9) | 2.7 | 65:35 | 2.1 | no | 30:70 |
| CA-630/CA-890 (1:9) | 5.0 | 60:40 | 1.42 | no | 30:70 |
| CA-630/CA-890 (1:9) | 6.0 | 56:44 | 1.48 | no | 30:70 |
| CA-630/CA-890 (1.9) | 10.0 | 50:50 | 0.96 | no | 30:70 |

TABLE 1-continued

Example 11. Polymer Cement Emulsion Drop Size and Stability Against Phase Segregation. Cements are 20% Polymer in Various Blends of MEK and CH. The polymer is a linear hydrogenated triblock copolymer of the type ABA where A is styrene and B is hydrogenated butadiene.

| Emulsifier | Emulsifier Concentration (phr)* | Cement:H$_2$O Ratio | Mean Drop Diameter (μm) | Phase Segregation | MEK:CH Ratio |
|---|---|---|---|---|---|
| CA-630/CA-890 (1:9) | 4.6+ | | | | |
| SLS | 2.0 | 60:40 | 0.90 | no | 30:70 |
| CA-630/CA-890 (1:9) | 3.8+ | | | | |
| SLS | 1.7 | 60:40 | 0.81 | no | 30:70 | phr* = Parts per hundred rubber.
SDS = Sodium dodecyl sulfate.
SLS = Sodium lauryl sulfate.
N25-S = Sodium (S) salt of sulfated Neodol ® alcohol.
N23-3S = Sodium (S) salt of sulfated Neodol ® ethoxylate.
CA 630 = (Igepal ®) Octyl-phenol ethoxylate (9 EO groups).
CA 890 = (Igepal ®) Octyl-phenol ethoxylate (40 EO groups).
Calsoft F-90 = Sodium dodecyl benzene sulfonate.
Nekal BA-77 = Sodium alkyl naphthalene sulfonate.
Alipal ® EP-110 = Ammonium salt of sulfated nonyl-phenol ethoxylate (9 EO groups).
Alipal ® EP-120 = Ammonium salt of sulfated nonyl-phenol ethoxylate (30 EO groups).
Emcol 4500 = Sodium dioctyl sulfosuccinate.
OP = (Synperonic) Octyl-phenol ethoxylate (number of EO repeat units in parentheses).
T-908 = (Synperonic) Star block copolymer of polypropylene oxide and polyethylene oxide with 4 legs; each leg has approximately 17 EO repeat units and 92 EO repeat units.

TABLE 2

Example 11. Polymer Cement Emulsion Drop Size and Stability Against Phase Segregation. Cements are 20% Polymer in a 40:60 Blend of MEK and CH. The polymer is the polymer used in Table 1 which has been grafted with about 2% weight percent maleic anhydride.

| Emulsifier | Emulsifier Concentration (phr)* | Cement:H$_2$O Ratio | Mean Drop Diameter (μm) | Phase Segregation |
|---|---|---|---|---|
| SDS | 6.7 | 60:40 | 0.39 | no |
| SDS | 5.4 | 65:35 | 0.42 | no |
| SDS | 4.3 | 70:30 | 0.40 | no |
| SDS | 4.0 | 65:35 | 0.38 | no |
| SDS | 2.7 | 65:35 | 0.48 | no |
| SDS | 0 | 65:35 | — | phase inversion |
| SDS | 0 | 50:50 | 4.2 | yes |
| SDS | 1.3 | 65:35 | 0.59 | no |
| N25-S | 4.0 | 65:35 | 0.42 | no |
| N25-S | 2.7 | 65:35 | 0.62 | no |
| N25-S | 1.3 | 65:35 | 0.68 | no |
| N25-S | 5.4 | 65:35 | 0.44 | no |
| N45-S | 5.4 | 65:35 | 0.46 | no |
| N23-3S | 6.7 | 60:40 | 0.57 | no |
| N23-3S | 5.4 | 65:35 | 0.54 | no |
| N23-6.5S | 5.4 | 65:35 | 0.64 | no |
| N23-9S | 5.4 | 65:35 | 0.62 | no |
| Calsoft F-90 | 6.7 | 60:40 | 0.44 | no |
| Nekal ® BA-77 | 6.7 | 60:40 | 0.62 | no |
| Emcol ® 4500 | 6.7 | 60:40 | 1.90 | yes |
| Alipal ® EP110 | 5.4 | 65:35 | 0.47 | no |
| Alipal ® EP120 | 5.4 | 65:35 | 0.79 | no |
| Alipal ® EP110 | 2.7 | 65:35 | 0.55 | no |
| OP7.5/T-908 (3:1) | 5.4 | 65:35 | — | yes |
| CA-630/CA-890 (1:9) | 5.4 | 65:35 | 1.01 | no |
| CA-630/CA-890 (3:1) | 5.4 | 65:35 | 3.44 | yes |
| CA-630/CA-890 (1:9) | 4.0 | 65:35 | 1.0 | no |

*phr = parts per hundred rubber.

We claim:

1. A process for producing stable polymer latexes with an average particle size of less than one micron, which comprises:
   (a) making a polymer cement of a block copolymer of a conjugated diene and a vinyl aromatic hydrocarbon and a blend of a non-aromatic solvent for the block copolymer and from 5 to 50 weight percent of the blend of at least one non-aromatic cosolvent having a solubility parameter in the range from 8.7 to 9.9;
   (b) emulsifying the polymer cement at an aqueous phase to cement weight ratio of from 10:1 to 1:3 by adding it to an aqueous phase containing from 0.1 to 10 weight percent of the aqueous phase of one or more surfactants, and
   (c) removing solvent, cosolvent and excess water from the emulsion.

2. The process of claim 1 wherein the polymer cement comprises 15 to 30 percent by weight of the block copolymer, the block copolymer molecular weight is above 25,000 and the vinyl aromatic hydrocarbon block molecular weight is above 5000.

3. The process of claim 2 wherein the cosolvent comprises from 20 to 45 percent by weight of the blend.

4. The process of claim 2 wherein the cosolvent is selected from the group consisting of methyl ethyl ketone, ethyl acetate, tetrahydrofuran, diethyl ketone, n-propyl acetate, diethylene glycol monoethyl ether, dipropylene glycol monomethyl ether, cyclohexanone, diacetone alcohol, isophorone, methyl cyclohexanone, propyl formate, dibutyl phthalate, ethylene glycol monobutyl ether, diethylene glycol, and 2-ethylhexanol.

5. The process of claim 1 wherein the aqueous phase to cement weight ratio is from 2:1 to 1:2.

6. The process of claim 2 wherein the total amount of surfactant used is not more than 2 percent by weight of the polymer.

7. A process for producing stable polymer emulsions with an average drop size of less than one micron, which comprises:
(a) making a polymer cement of a block copolymer of a conjugated diene and a vinyl aromatic hydrocarbon and a blend of a non-aromatic solvent for the block copolymer and from 5 to 50 weight percent of the blend of at least one non-aromatic cosolvent having a solubility parameter in the range from 8.7 to 9.9; and
(b) emulsifying the polymer cement at an aqueous phase to cement weight ratio of from 10:1 to 1:3 by adding it to an aqueous phase containing from 0.1 to 10 weight percent of the aqueous phase of one or more surfactants.

8. A process for producing stable polymer latexes with an average particle size of less than one micron, which comprises:
(a) making a polymer cement of a block copolymer of a conjugated diene and a vinyl aromatic hydrocarbon which has been functionalized with polar groups and a blend of a solvent for the block copolymer and from 5 to 50 weight percent of the blend of a polar cosolvent;
(b) emulsifying the polymer cement at an aqueous phase to cement weight ratio of from 10:1 to 1:3 by adding it to an aqueous phase containing from 0.1 to 10 weight percent of the aqueous phase of one or more surfactants; and
(c) removing solvent, cosolvent and excess water from the emulsion.

9. The process of claim 8 wherein the polymer cement comprises 10 to 30 percent by weight of the block copolymer.

10. The process of claim 9 wherein the cosolvent comprises from 5 to 45 percent by weight of the blend.

11. The process of claim 9 wherein the cosolvent is selected from the group consisting of isopropyl alcohol, methyl ethyl ketone, acetone, isobutyl isobutyrate, ethyl acetate, methyl isobutyl ketone, n-butyl alcohol, isopropyl acetate, diisobutyl ketone, diisopropyl ketone, methyl isobutyl ketone, methyl amyl ketone, methyl propyl ketone, diethyl ketone, isophorone, diacetone alcohol, acetone, cyclopentanone, cyclobutadione, isobutyl n-butyrate, isopropyl isobutyrate, methyl amyl acetate, butyl butyrate, sec. butyl acetate, sec. amyl acetate, isobutyl acetate, isopropyl acetate, amyl acetate, butyl acetate, cellosolve acetate, propyl formate, dibutyl phthalate, methyl acetate, ethyl lactate, butyronitrile, aceto-nitrile, propylene carbonate, ethylene carbonate, diethyl ether, dimethyl ether, dichloroethyl ether, dioxane, tetrahydrofuran, butyl carbitol, butyl cellosolve, diethylene glycol, 2-ethylhexanol, carbitol, cellosolve, methyl isobutyl carbinol, n-octanol, 2-ethylbutanol, n-hexanol, sec. butanol, n-pentanol, n-butanol, cyclohexanol, isopropanol, n-propanol, ethanol, ethylene glycol, methanol, and glycerol.

12. The process of claim 8 wherein the aqueous phase to cement weight ratio is from 2:1 to 1:2.

13. The process of claim 9 wherein the amount of surfactant used is not more than 2 percent by weight of the polymer.

14. The process of claim 9 wherein an additional cosolvent is used, said additional cosolvent being non-aromatic and having a solubility parameter of from 8.7 to 9.9.

15. A process for producing stable polymer emulsions with an average particle size of less than one micron, which comprises:
(a) making a polymer cement of a block copolymer of a conjugated diene and a vinyl aromatic hydrocarbon which has been functionalized with polar groups and a blend of a solvent for the block copolymer and from 5 to 50 weight percent of the blend of a polar cosolvent; and
(b) emulsifying the polymer cement at an aqueous phase to cement weight ratio of from 10:1 to 1:3 by adding it to an aqueous phase containing from 0.1 to 10 weight percent of the aqueous phase of one or more surfactants.

16. The process of claim 15 wherein an additional cosolvent is used, said additional cosolvent being non-aromatic and having a solubility parameter of from 8.7 to 9.9.

* * * * *